United States Patent
Strackbein et al.

[19]

[11] Patent Number: 6,109,053
[45] Date of Patent: Aug. 29, 2000

[54] MODULAR CASING STRUCTURE

[75] Inventors: Heinrich Strackbein, Bieberteil; Bernd Georg, Herborn; Walter Nicolai, Buseck; Michael Diebel, Dillenburg; Achim Edelmann, Dillenburg-Donsbach, all of Germany

[73] Assignee: Rittal-Werk Rudolf Loh GmbH & Co., Herborn, Germany

[21] Appl. No.: 09/142,416

[22] PCT Filed: Feb. 13, 1997

[86] PCT No.: PCT/EP97/00654

§ 371 Date: Sep. 3, 1998

§ 102(e) Date: Sep. 3, 1998

[87] PCT Pub. No.: WO97/34346

PCT Pub. Date: Sep. 18, 1997

[30] Foreign Application Priority Data

Mar. 13, 1996 [DE] Germany .......................... 196 09 699

[51] Int. Cl.[7] ................................................. F25D 23/12
[52] U.S. Cl. ................................. 62/259.1; 62/298; 62/449
[58] Field of Search ............................... 62/259.1, 259.2, 62/298, 448, 449, 416, 263

[56] References Cited

U.S. PATENT DOCUMENTS 3,868,158  2/1975  Laboue .
5,009,081  4/1991  Kruck et al. ............................. 62/264
5,277,039  1/1994  Haasis ..................................... 62/448
5,284,023  2/1994  Silva et al. ............................... 62/77
6,000,458  12/1999  Watanabe ............................. 165/11.1

FOREIGN PATENT DOCUMENTS

| 1 264 553 | 3/1969 | Germany . |
| 38 23 656 A1 | 1/1990 | Germany . |
| 41 11 457 C 1 | 10/1991 | Germany . |
| 41 10 323 C 1 | 7/1992 | Germany . |
| 295 19 260 U 1 | 3/1996 | Germany . |
| 3-225180 | 10/1991 | Japan ..................................... 62/298 |
| 1-306793 | 12/1998 | Japan ................................. 62/259.1 |

*Primary Examiner*—William Doerrler
*Assistant Examiner*—Melvin Jones
*Attorney, Agent, or Firm*—Jansson, Shupe, Bridge & Munger, Ltd.

[57] ABSTRACT

A modular housing assembly comprises a base cabinet body having a height and four orthogonal wall elements. A fifth wall element is angled with respect to the first, second, third and fourth wall elements and a pedestal is fixed below the third wall element. First and second lateral protective walls overlay the first and second wall elements and extend along the height of the cabinet body. A double-walled door is mounted with respect to the base cabinet body and a roof housing fixed above the fourth wall element. Wall redundancy substantially increases the ability of the assembly to resist vandalism and further protect the contents of such assembly.

16 Claims, 2 Drawing Sheets

MODULAR CASING STRUCTURE

RELATED APPLICATION AND CLAIM OF PRIORITY

This application is a 371 of PCT Application No. PCT/EP97/00654 having an international filing date of Feb. 13, 1997, which designates at least one country in addition to the United States and which claims priority from German Application No. 196 09 699.5 filed Mar. 13, 1996. For priority purposes, this application claims the benefit of 35 USC 371 and/or 35 USC 120.

FIELD OF INVENTION

The invention relates to cabinet-structure type supports and, more particularly, to such supports having plural closures, e.g., auxiliary closure within closure.

BACKGROUND OF THE INVENTION

It is not uncommon for industrial equipment to be mounted in out-of-door cabinets or housings exposed to the weather and, particularly, to occasional vandalism. While ways to configure equipment housings to resist weather are well-known, not a great deal of attention has been given to configuring housings to resist vandalism. This is an important consideration since the housing may contain equipment, e.g., communication or other electrical equipment, important or even critical to users connected thereto.

Switch cabinets are often assembled on a pedestal with an air conditioner fastened to the roof of the switch cabinet. It is also known that smaller cabinet units can be arranged and connected one on top of the other.

A disadvantage of such known cabinets is that access to the cabinet interior can often be gained by forcing open or tearing or piercing a cabinet door or static panel. A housing assembly which addresses this disadvantage would be an important advancement in the art.

OBJECTS OF THE INVENTION

An object of the invention is to provide a modular housing assembly that overcomes some of the shortcomings of the prior art.

Another object of the invention is to provide a modular housing assembly that offers considerably improved protection against vandalism. How these and other objects are accomplished will become apparent from the following descriptions and from the drawings.

SUMMARY OF THE INVENTION

The invention involves a modular housing assembly comprised of a base cabinet body having five wall elements, a pedestal, one or more ground housings and a roof housing. Additional protective "overlay-type" lateral walls extend along part or all of the height of the assembled housing. A double-walled door closes and locks at least the base cabinet body.

According to the invention, at least the base cabinet body is secured on all sides by two respective walls so that entry into its inner space is made considerably more difficult. The lateral protective walls (which are actually exterior walls overlaying parallel interior walls) lend the visual impression of a conventional assembly. This so since the lateral protective walls extend over and cover or "mask" the joints where individual modular units of the housing assembly are joined together. In order to gain entry to the inner space of the base cabinet body, the ground housing or the roof housing, two respective walls, e.g., sheet metal walls, must be penetrated or otherwise defeated. This structure represents considerably improved protection against vandalism for housings that are set up outside.

According to one embodiment of the invention, instead of the double-panel wall element serving as the rear wall of the base cabinet body, one or more wall air conditioners are connected to the base cabinet body so that the components in the base cabinet body can be cooled. The air conditioners are, themselves, double-walled and serve to completely close that area otherwise closed by the rear wall.

In another aspect of the invention, the housing assembly includes one or more ground housings beneath the base cabinet body. In a more specific embodiment, a single ground housing is configured as a battery receptacle, thereby equipping the assembly with a source of standby emergency power. Most preferably, access to the batteries is by a ground housing fitted with a pull-out drawer.

In yet another configuration, the housing assembly includes a frame-like pedestal interposed between and connected to both the base cabinet body (the main compartment for equipment confined in the assembly) and to the single or plural ground housings, as the case may be. To state it another way, the pedestal is mounted to "subdivide" the base cabinet body from the ground housing(s).

In a variation of such configuration, the single or plural ground housings are interposed between the base cabinet body and the pedestal. In this configuration, the pedestal closes off the underside of the ground housing(s) and isolates such ground housing(s) from the underlying support surface, e.g., the earth or a concrete pad or the like.

In yet another embodiment of the invention, cooling of the interior of the base cabinet body (and of the equipment confined in it) is implemented by a box-like (i.e., enclosed) roof air conditioner received into the roof housing. This construction provides double wall protection for the air conditioner and the lateral, vertically extending protective walls need not extend sufficiently far upward to overlay the roof housing. However, if the lateral protective walls are extended upwardly to overlay the roof housing, then vandal-resisting security in this area is further increased.

In still another embodiment of the invention, a type of rain protection is achieved if the roof housing used on the assembly having the built-in roof air conditioner is covered by a roof element that extends beyond all outward edges of the roof housing. Most preferably, such roof element extends sufficiently far outwardly to define a circumscribing ventilation slot between the roof element and the roof housing. A similar configuration is used with that arrangement wherein one or more wall air conditioners are mounted to the base cabinet body. Since such wall air conditioners jut outward horizontally, the roof element also juts outwardly to extend horizontally beyond all outward edges of the base cabinet body and wall air conditioner(s) sufficiently far to define the circumscribing ventilation slot.

Where one or two wall air conditioners are used, the greatest security and vandal resistance is achieved in the rear area of the base cabinet body by constructing the wall air conditioners to have double walls and the inner wall facing the base cabinet body with both an outlet and an inlet opening.

And the overall height of such air conditioners may vary. Such air conditions may extend "top to bottom," i.e., from the top edge of the roof housing to the bottom edge of the ground housing. Or such air conditioners may be constructed to extend only along the height of the base cabinet body. In this configuration, it is preferred to cover the ground housing and the roof housing with second protective wall components above and below the air conditioners.

It is noted above that a double-walled door closes and locks at least the base cabinet body. For reasons of appearance and security, such door may extend along the entire height of the base cabinet body, the ground housing(s) and the roof housing.

And the lateral protective walls may be coextensive with (and extend along the height of) only the ground housings, the base cabinet body and the roof housing. In such embodiment, the pedestal is oversized slightly so that its outer perimeter is flush with the outer sides of the door and lateral protective walls.

In order to prevent the exposed lateral protective walls and the walls covered thereby from being loosened from the outside, it is preferred that such walls be attached to the housing with fasteners that are neither visible nor accessible from the outside. In such embodiment, the roof element, the roof housing and the ground housing(s) are secured by virtue of an access door which overlaps such element and housings when the door is closed. The invention is explained in more detail on the basis of two exemplified embodiments shown in the drawings in exploded illustration.

DETAILED DESCRIPTION OF PREFERRED EMBODIMENTS

Figure 1:
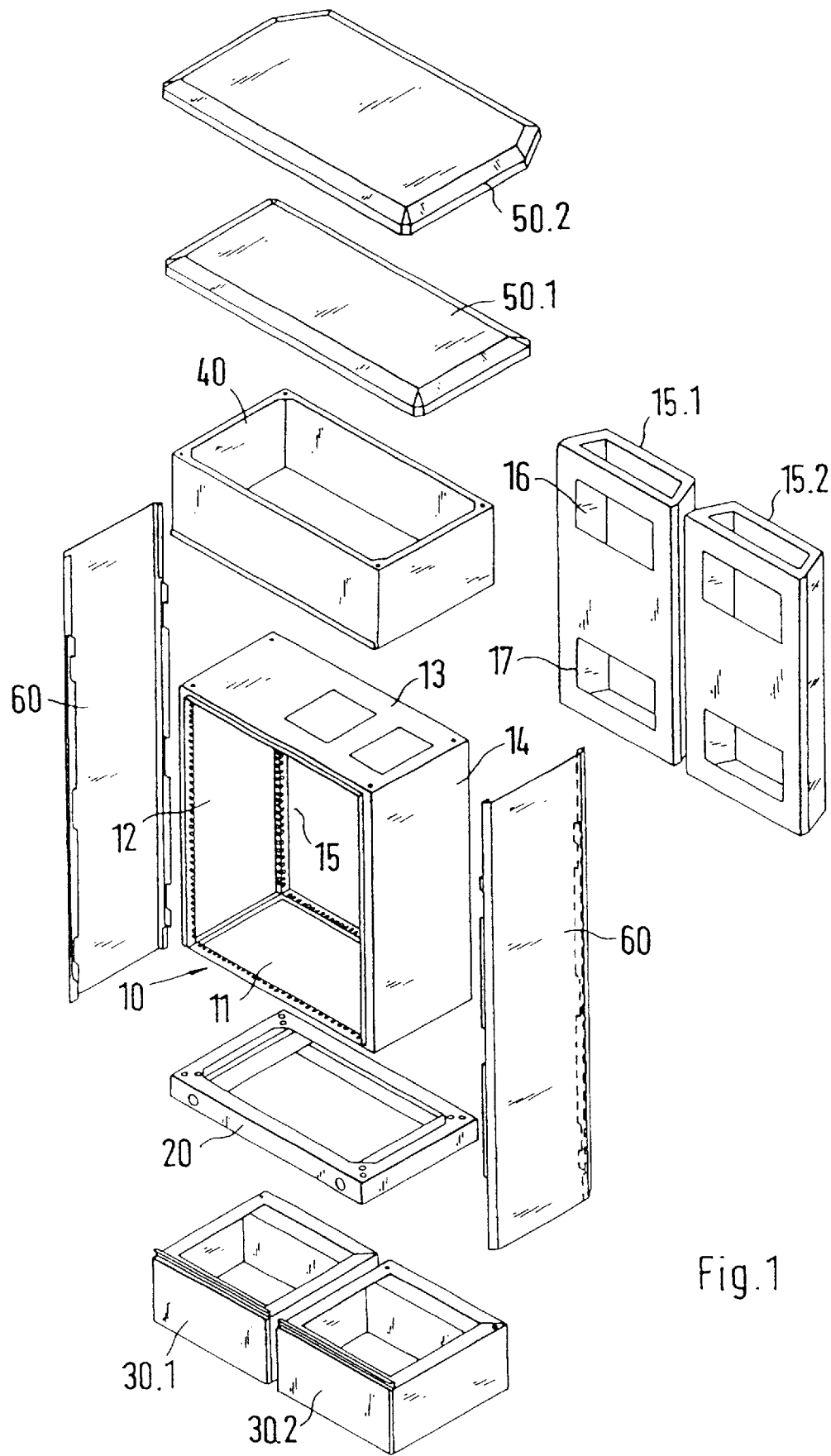
FIG. 1 is an exploded perspective view of the modular housing assembly with certain components, e.g., modular units.

FIG. 1 shows the modular housing assembly which includes a base cabinet body 10 with first and second wall elements 11, 14, respectively, third and fourth wall elements 11, 13, respectively, and a fifth or closure wall element 15 which in one embodiment, is a flat sheet metal element. A frame-like pedestal 20, attached to the body 10 adjacent to the wall element 11, serves as a ground wall. Both ground housings 30.1 and 30.2 are connected to the underside of the pedestal 20 and support such pedestal 20 as well as the components above such pedestal 20.

A roof housing 40 is fastened to the wall element 13 and serves as a covering wall for the cabinet body 10. Such roof housing 40 is covered by a roof element 50.1 which, preferably, extends beyond all sides of the roof housing 40 and defines a circumscribing ventilation slot between such element 50.1 and the housing 40.

As a deterrent to unauthorized entry into the assembly and to help avoid damage to equipment confined therein, at least the walls 12, 14 of the cabinet body 10 are overlaid or covered by lateral protective walls 60. As further described, such walls 60 may have a vertical height to be coextensive only with walls 12, 14 or may have a height that enables such walls 60 to cover, for example, some or all of the components including the roof housing 40, the pedestal 20, and the ground housings 30.1, 30.2. Similarly, the closure wall element 15 and the door 70 can be coextensive with some or all of such components so that overall doublewalled construction is achieved.

Instead of using wall element 15 formed of flat sheet metal (or a double layer thereof), the element 15 may be embodied as a single air conditioner 15.3 or as a pair of wall air conditioners 15.1 and 15.2 and be mounted to the base cabinet body 10. In the instance of the latter, the air conditioners 15.1, 15.2 include an inlet opening 17 (through which warmer air flows from the body 10 to the conditioner 15.1) and an outlet opening 16 through which chilled air flows from the conditioner 15.1 to the body 10.

In such embodiment, it is preferred to use roof element 50.2 which is adapted to the protruding shape of the wall air conditioners 15.1 and 15.2. In other words, element 50.2 protrudes horizontally beyond the walls 60, the air conditioners 15.1, 15.2 and the door 70 to a dimension such that a circumscribing ventilation slot is defined. And it is also preferred that such air conditioners 15.1, 15.2, 15.3 are of double wall construction to provide redundancy in inhibiting access to the interior of the body 10 and in preventing damage to its contents.

The housing assembly configured in one of the ways described above is very resistant to vandalism. Such resistance is enhanced if the lateral protective walls 60 and the wall air conditioners 15.1 and 15.2 are fastened to the base cabinet body 10, the ground housing 30.1 and 30.2 and the roof housing 40 with fasteners that are neither visible nor accessible from the outside.

If the wall air conditioners 15.1, 15.2, 15.3 are coextensive with only the base cabinet body 10, then additional lateral protective walls can be attached to cover the ground housings 30.1 and 30.2 and the roof housing 40, in order to complete the housing assembly in double walled fashion.

Figure 2:
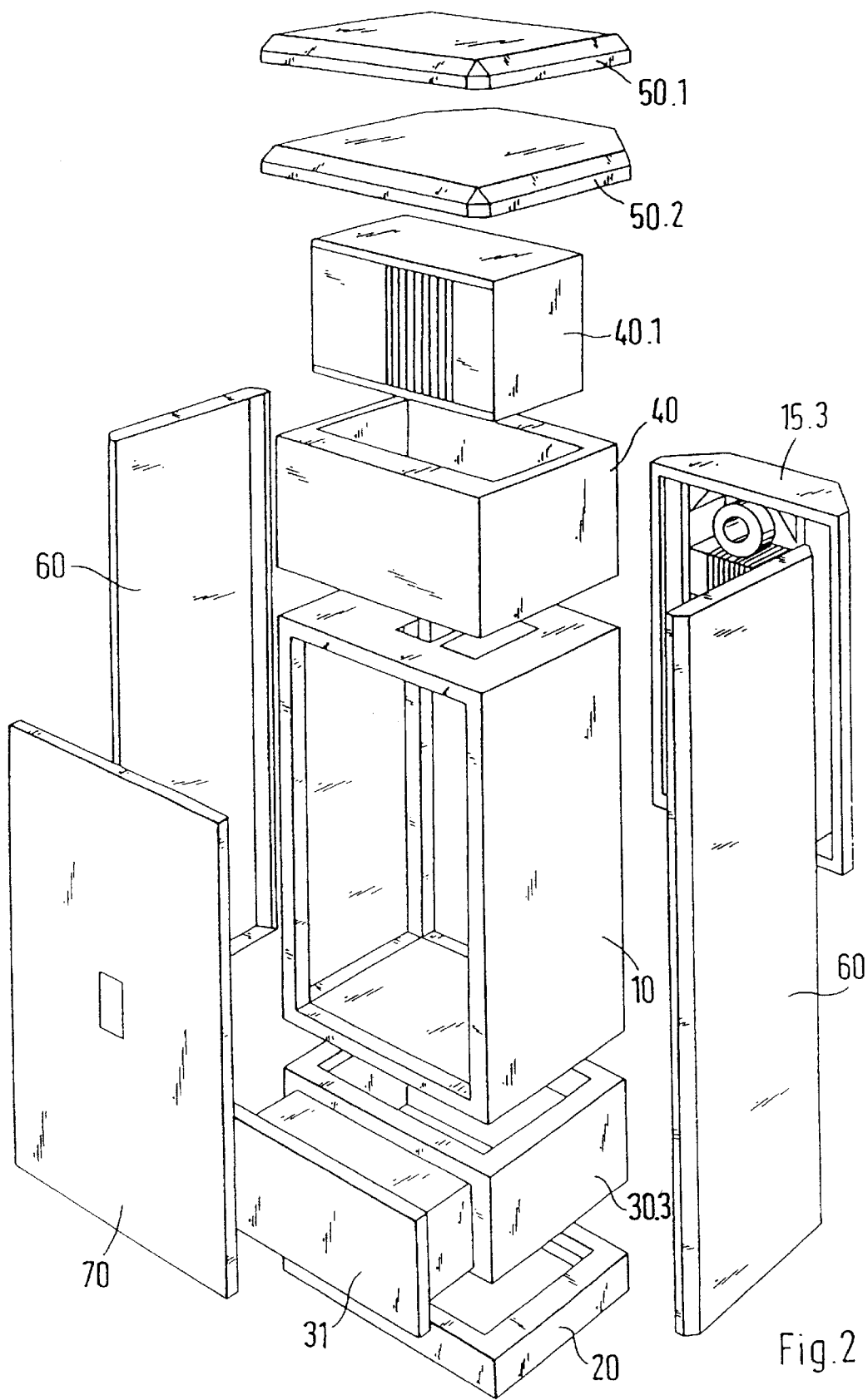
FIG. 2 is an exploded perspective view of the modular housing assembly with other components or modular units.

FIGS. 1 and 2, taken together, disclose an embodiment of the assembly in which the ground housing 30.3 is constructed as a battery receptacle. Housing 30.3 is configured to receive appropriate batteries with slight clearance and, preferably, housing 30.3 has a drawer 31 that receives the batteries. (Of course, the size and number of such batteries may vary with the application.) The lateral width of the base cabinet body 10 is selected to be about equal to the lateral width of the housing 30.3, thereby allowing the housing 30.3 and the body 10 to be connected directly to one another. The pedestal 20 then closes off the housing assembly in relation to the supporting surface.

In another embodiment of the invention, the roof housing 40 receives a roof air conditioner 40.1 and the housing 40 and conditioner 40.1 are covered by roof element 50.1. In a fashion similar to that described above, element 50.1 juts horizontally outward beyond all sides of the roof housing 40 to the dimension necessary to define a circumscribing ventilating slot between the element 50.1 and the housing 40.

The door 70 has double walls and, as a minimum, the vertical dimension of such door 70 is selected to be coextensive with only the base cabinet body 10. A door 70 of greater vertical dimension would, depending upon the dimension, also be coextensive with the roof housing 40, or the ground housing 30.3 or both of the housings 40, 30.3

Similarly, the lateral protective walls 60 have a vertical dimension such that the walls 60 are, as a minimum, coextensive with the walls 12, 14. Walls 60 of greater vertical dimension would, depending upon the dimension, also be coextensive with the roof housing 40, the pedestal 20, the grounding housing 30.3, the ground housings 30.1, 30.2.

The individual modules in this housing assembly can be manufactured optimally and in a cost effective manner with regard to the selection of materials and surfaces. The base cabinet body 10 can be manufactured of aluminum zinc coated steel sheet without the need for further painting and can be used as a high frequency (HF) shielded cabinet. The visible protective walls can be individually treated, e.g., they can be powder coated.

While the principles of the invention have been shown and described in connection with but a few embodiments, it is to be understood clearly that such embodiments are by way of example and are not limiting.

What is claimed:

1. A modular housing assembly, comprising:
    a base cabinet body having a height and a first wall element and a second wall element parallel to each other;
    a third wall element and a fourth wall element parallel to each other and perpendicular to the first and second wall elements;
    a fifth wall element angled with respect to the first, second, third and fourth wall elements;
    a pedestal fixed below the third wall element;
    a first lateral protective wall and a second lateral protective wall overlaying the first and second wall elements and extending along the height of the cabinet body;
    a double-walled door mounted with respect to the base cabinet body, and
    a roof housing fixed above the fourth wall element.

2. The housing assembly of claim 1 wherein:
    the fifth wall element is embodied as at least one wall air conditioner mounted with respect to the base cabinet body.

3. The housing assembly according to claim 2 wherein:
    the wall air conditioner is attached to the base cabinet body; and
    a roof element is fixed above the base cabinet body, projects beyond the base cabinet body and define a circumscribing ventilation slot between the roof element and the base cabinet body.

4. The housing assembly of claim 2 wherein:
    the wall air conditioner is of double-wall construction and includes an inner wall and an outer wall;
    the inner wall of the air conditioner faces the base cabinet body and includes an outlet opening and an inlet opening.

5. The housing assembly of claim 2 wherein:
    the wall air conditioner is coextensive with the base cabinet body; and
    the ground housing and the roof housing are overlayed with respective protection walls.

6. The housing assembly of claim 5 wherein the lateral protective walls and the protection walls are attached to the base cabinet body by fasteners which are invisible and inaccessible from the exterior of the assembly.

7. The housing assembly of claim 1 including a ground housing fixed below the base cabinet body and defining a battery receptacle.

8. The housing assembly of claim 7 wherein the ground housing includes a pull-out drawer.

9. The housing assembly of claim 1 including a pedestal fixed below the base cabinet body and a ground housing fixed below the pedestal.

10. The housing assembly of claim 1 including a ground housing fixed below the base cabinet body and a pedestal fixed below the ground housing.

11. The housing assembly of claim 10 wherein:
    the lateral protective walls are coextensive with the ground housing, the base cabinet body and the roof housing;
    the door has an exterior surface; and
    the pedestal is flush with the door exterior surface and with the lateral protective walls.

12. The housing assembly of claim 1 including a roof housing fixed above the fourth wall element and containing an air conditioner therein.

13. The housing assembly of claim 12 including a roof element fixed above the roof housing and projecting beyond such roof housing, thereby defining a circumscribing ventilation slot between the roof element and the roof housing.

14. The housing assembly of claim 13 including a ground housing fixed below the base cabinet body and wherein the door overlaps and secures the roof housing and the ground housing.

15. The housing assembly of claim 1 including a ground housing fixed below the base cabinet body and a double-wall closure door extending to cover the base cabinet body, the ground housing and the roof housing.

16. The housing assembly of claim 1 wherein:
    the base cabinet body is made of steel sheet and is free of a surface protection layer; and
    the lateral protective walls include a protective surface coating.

* * * * *